Oct. 21, 1958 R. W. GILBERT 2,857,571
DIRECT CURRENT MEASURING APPARATUS
Filed March 12, 1957
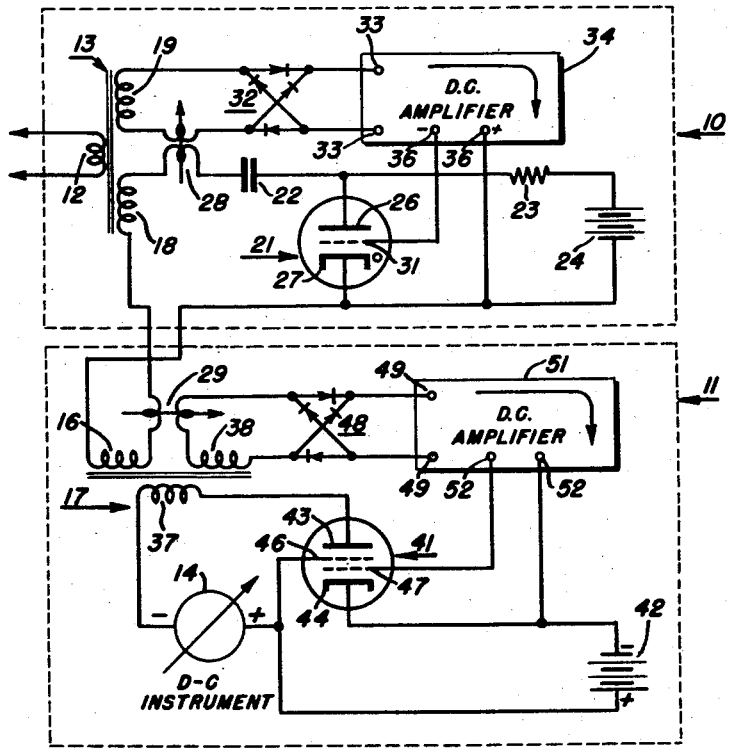
ROSWELL W. GILBERT
INVENTOR.
BY
Rudolph J. Jurick
ATTORNEY United States Patent Office 2,857,571
Patented Oct. 21, 1958

2,857,571

DIRECT CURRENT MEASURING APPARATUS

Roswell W. Gilbert, Montclair, N. J., assignor, by mesne assignments, to Daystrom, Incorporated, Murray Hill, N. J., a corporation of New Jersey Application March 12, 1957, Serial No. 645,602

11 Claims. (Cl. 324—117)

This invention relates to apparatus for the measurement of D.-C. currents and more particularly to a novel pulsed reactor D.-C. current transformer system for the measurement of large D.-C. currents.

Saturable reactor systems, which are often referred to as transductors, are currently employed in the measurement of relatively large D.-C. currents of the order of 50,000–75,000 amperes. However, the application of reactor systems for the measurement of such large currents presents certain difficulties by reason of the large magnetization required. The large power required for the counter-magnetomotive force involves copper losses in the balancing windings of the order of kilowatts, resulting in expensive designs of the reactor and control equipment. For example, a 75,000 ampere installation requires about 18 kva. for excitation of the core.

To overcome these large power losses in systems designed for the measurement of very high D.-C. currents, I provide novel apparatus operating on the pulse principle wherein the counter-electromotive force is applied periodically at a duty cycle so proportioned to provide proper operation of the system but at a large reduction of the average power required by core excitation. The primary magnetization is balanced by recurrent peaks of counter-electromotive force current controlled by an automatic feedback system. The peak counter-magnetization current then represents the primary magnetization. A second stage is applied to reverse the process and produce a steady D.-C. current representing the peak level; such D.-C. current being taken as an indication of the current being measured.

An object of this invention is the provision of a novel apparatus for the measurement of D.-C. current.

An object of this invention is the provision of a novel saturable reactor system for the measurement of large D.-C. currents and in which the power required for core excitation is reduced substantially below that required in prior systems.

An object of this invention is the provision of a system for the measurement of large D.-C. currents flowing in a conductor and comprising a magnetizable core magnetically coupled to the conductor, an exciting winding on the said core, the exciting winding being connected in opposed sense with respect to the current flowing in the conductor, a source of electrical pulses connected to the said exciting winding, a tertiary winding on the said core, a rectifier connected to the said tertiary winding and having an input therefrom, a D.-C. amplifier having an input from the said rectifier, the said D.-C. amplifier output regulating the amplitude of the said electrical pulses, the amplitude of the said electrical pulses being a measure of the said D.-C. current flowing in the said conductor.

An object of this invention is the provision of a system for measuring the D.-C. current flowing in a conductor and comprising a first magnetizable core magnetically coupled to the conductor, an exciting winding on the said core, means producing electrical pulses in the said exciting winding which pulses have a peak magnetomotive force substantially equal and opposite to the magnetomotive force produced by the said D.-C. current in the said first core, a second magnetizable core having a primary, secondary and tertiary winding, means connecting the said electrical pulses to the said primary winding, a source of D.-C. current connected to the said secondary winding, a rectifier connected to the said tertiary winding, a D.-C. amplifier having an input from the said rectifier, the D.-C. amplifier output regulating the amplitude of the said source of D.-C. current, the amplitude of the said D.-C. current being a measure of the said D.-C. current flowing in the said conductor.

These and other objects and advantages will become apparent from the following description when taken with the accompanying drawing. It will be understood, the drawing is for purposes of illustration, and is not to be construed as defining the scope or limits of the invention, reference being had for the latter purpose to the appended claims.

The single drawing is a diagrammatic presentation of the novel current measuring apparatus of my invention.

The current measuring device comprises an inverter section 10 and a converter section 11. The D.-C. current to be measured is applied to the primary winding 12 of a saturable reactor 13 in the inverter section of the device, and an indication of the magnitude of the D.-C. current is obtained at a D.-C. instrument 14 in the converter section 11. The inverter section functions to produce a series of electrical pulses having a magnitude which is proportional to the magnitude of the D.-C. current in the primary winding 12. The electrical pulses from the inverter section 10 are applied to the primary winding 16 of a second saturable reactor 17 in the converter section of the device, wherein they are converted to a D.-C. current which is proportional to the magnitude of the electrical pulses. Thus, the D.-C. current produced in the converter section and measured by the meter 14 is a direct function of the D.-C. current being measured.

Describing the current measuring device in detail, it will be seen that the saturable reactor 13 is provided with a secondary winding 18 and a tertiary winding 19, in addition to the above-mentioned primary winding 12. While I have shown the primary winding as having a plurality of turns, it will be understood that in actual practice the primary winding constitutes the current-carrying bus which passes through the reactor core, thus providing a one (1) turn coupling. The secondary winding 18 is supplied with the output from a relaxation type oscillator which includes a gas triode tube, or thyratron 21, a capacitor 22, resistor 23 and a source of D.-C. current 24. The capacitor 22 is connected in a series circuit between the anode 26 and cathode 27 of the thyratron 21, which series circuit includes the primary winding of a first air-cored mutual reactor 28, the secondary winding 18 of the saturable reactor 13, the primary winding of a second air-cored mutual reactor 29, and the primary winding 16 of the saturable reactor 17. The resistor 23 and source of D. C. current 24 are connected in series between the anode 26 and cathode 27 of the thyratron 21. The oscillator produces a series of pulses at the secondary winding 18, the magnitude of which are controlled by the potential on the grid 31 of the thyratron. When the magnitude of oscillation is sufficiently large to produce pulse peaks of magnetomotive force in the secondary winding 18 which are equal to, or larger than the primary magnetomotive force created by the D.-C. current to be measured in the primary winding 12 a potential surge is developed in the tertiary winding 19. The tertiary winding is connected to the input diagonals of a full-wave bridge rectifier 32 of the type well known by those skilled in this art. The output diagonals of the bridge rectifier are connected to the input terminals 33, 33 of a D.-C. amplifier 34, and the D.-C. amplifier output terminals 36, 36 are connected between the cathode 27 and grid 31 of the thyratron, thus providing a controlled grid bias thereto.

As mentioned above, the primary winding 16 of the reactor 17 is connected in series with the secondary winding 18 of the reactor 13, therefore, pulses, which are proportional to the pulses produced at the secondary winding 18, are produced at the primary winding 16 of the reactor 17. As in the saturable reactor 13 in the inverter section 10, the saturable reactor 17 is provided with a secondary winding 37 and a tertiary winding 38. The secondary winding 37 is connected in opposed sense to the primary winding 16 and carries a controlled D.-C. current of a magnitude sufficient to produce a magnetomotive force to balance the peak primary magnetomotive force produced by the current in the primary winding 16. The D.-C. current for the secondary winding 37 comprises the plate current of an electronic tube 41; the secondary winding 37 being connected in series circuit connection with the meter 14 and a source of anode potential 42, and the series combination connected between the anode 43 and cathode 44 of the tube 41. The tube 41 is a tetrode type having a screen grid 46 which is connected directly to the positive source of potential 42. The magnitude of the plate current of the tube 41 is controlled by the grid bias potential, that is, the potential between the cathode 44 and the control grid 47. When the magnitude of oscillation (of the relaxation type thyratron oscillator in the inverter section 10 of the device) is sufficiently large to produce pulse peaks of magnetomotive force in the primary winding 16 of the saturable reactor 17 which are equal to, or greater than, the secondary magnetomotive force created by the D.-C. plate current of the tube 41 which flows through the secondary winding 37, a potential surge is developed in the tertiary winding 38. As in the inverter section, the tertiary winding 38 is connected to the input diagonals of a full-wave bridge rectifier 48. The output diagonals of the bridge rectifier are connected to the input terminals 49, 49 of a D.-C. amplifier 51, and the D.-C. amplifier output terminals 52, 52 are connected between the cathode 44 and control grid 47, thus controlling the grid bias of the tetrode tube 41.

The D.-C. amplifiers 34 and 51 may be of any desired type, and have therefore not been shown in detail in the drawing. Any of the well known and conventional types of D.-C. amplifiers may be used as will be understood by those skilled in this art. A D.-C. amplifier of the type described in my United States Patent No. 2,744,168, entitled D.-C. Amplifier, and issued May 1, 1956, is particularly adapted for use in the novel current measuring circuit of my invention.

Although the operation of the current measuring circuit is believed to be apparent from the above description, a brief explanation follows. The current to be measured, which may be in the vicinity of 100,000 amperes, is applied to the primary winding 12 of the saturable reactor 13, thereby saturating the core of the reactor. With no D.-C. amplifier 34 input potential at the input terminals 33, 33 the output potential at the amplifier output terminals 36, 36 is at a predetermined value and provides a negative grid bias potential to the thyratron 21. The grid bias thus provided is such that the thyratron will fire at a predetermined anode voltage; the anode voltage being, substantially, the voltage on the capacitor 22. (The potential developed at the mutual reactors 28 and 29 and the windings 16 and 18 is relatively small during the charging of the capacitor 22 due to the slow rate of charge of the capacitor. For this reason, the anode potential is substantially the potential on the capacitor 22 when the capacitor is charging.) The capacitor charges through the resistor 23, which is of relatively high resistance, from the source of D.-C. potential 24. When the capacitor voltage reaches the thyratron breakdown voltage, the tube fires and the capacitor discharges through the mutual reactor 28, windings 18 and 16, mutual reactor 29 and the thyratron. The discharge current results in a pulse at the secondary winding 18 which, in turn, results in a magnetomotive force which is larger than the primary magnetomotive force which is produced by the current in the primary winding 12. The capacitor 22 continues to discharge until the voltage across the thyratron falls below that which is necessary to maintain the ionization of the thyratron. The value of resistance of the resistor 23 is large whereby the source of potential 24 is unable to recharge the capacitor rapidly enough to maintain conduction of the thyratron. The thyratron deionizes, the grid bias regains control, and the capacitor 22 charges again.

Because the windings 12 and 18 are wound on the core of the saturable reactor 13 in a manner such that the pulse from the thyratron and the D.-C. current in the winding 12 produce opposite magnetization effects, a potential surge is developed in the tertiary winding 19. This potential at the tertiary winding 19 is rectified by the full-wave bridge rectifier 32 and applied to the input terminals 33, 33 of the D.-C amplifier 34 where the signal is amplified. From the amplifier output terminals 36, 36 the amplified signal is fed directly to the grid of the thyratron 21. The signal reduces the negative grid bias on the thyratron, allowing the tube to fire at a smaller anode to cathode voltage. The size or amplitude of the next pulse, which results when the tube ionizes and the capacitor discharges through the windings 18 and 16 and the tube, is thus reduced. This is effectively degenerative feedback controlling the secondary peak magnetomotive force at the winding 18 to the primary level at the winding 12.

It is seen, then, that pulses will appear at the primary winding 16 of the reactor 17 which are proportional in magnitude to the current flow in the primary winding 12 of the reactor 13. The D.-C. plate current of the tube 41 passes through the secondary winding 37 of the reactor 17 in a manner opposing the magnetization produced by the pulses in the primary winding 16. Any unbalance potential surge developed in the tertiary winding 38 is rectified by the rectifier 48, amplified by the amplifier 51 and fed to the control grid 47 of the tube 41. The D.-C. plate current through the secondary winding 37 is thus controlled to balance the peak primary magnetomotive force produced by the winding 16. In the converter section, the secondary magnetization is controlled in an opposite sense from that in the inverter section; that is, the level is produced in the converter section rather than limited by the feedback control, as in the inverter section. Because the control action in both the inverter and converter sections is a step-function, time constants are applied to the feedback path sufficient to limit the response speed to a suitable time resolution. This delay function is preferably incorporated in the D.-C. amplifiers 34 and 51 by the inclusion of a simple R-C time delay circuit, or any other desired means, as will be understood by those skilled in this art.

The air-cored mutual reactors 28 and 29 are included in the circuit to compensate the saturated inductance of the reactors, so that the tertiary winding potentials only appear with reactor core permeabilities larger than unity. For this reason, the reactors 28 and 29 are preferably adjustable, as indicated in the drawing. It will be understood that the saturable reactors 13 and 17 have a residual inductance when saturated because the core material, when saturated, still has a permeability of one (1), which is the same as the permeability of free space, or air. Thus, in the saturated condition, windings 18 and 19, of the saturable reactor 13, for example, still couple by some low value of mutual inductance. The extra mutual reactor 28, is adjusted to equal this saturated inductance, and is connected in the circuit oppositely to compensate out the residual mutual inductance. Thus, when the reactor 13 is saturated, the over-all net inductance of the combination is zero (0). Mutual inductance 29 does likewise for the other saturable reactor 17.

My novel current measuring device has an overall output D.-C. current to input D.-C. current ratio which is equal to the turns ratio product of the saturable reactors 13 and 17, or:

$$\frac{\text{Output D.-C.}}{\text{Input D.-C.}} = \frac{N12}{N18} \times \frac{N16}{N37}$$

wherein N is the number of turns and the subscripts 12, 18, 16 and 37 refer to the windings 12, 18, 16 and 37 on the reactors 13 and 17.

Modern core materials, in even large cores, will saturate on relatively few ampere-turns. Because of this, primary magnetizations of 10,000 ampere-turns and larger will allow a fractional percentage control accuracy when the control currents are large, thereby resulting in accurate current measurements with my device.

Pulse duty-cycle ratios of peak to average power up to 1000 are easily obtainable with my novel pulsed reactor system, so that a few watts of average power will develop an effective peak energy dissipation in the order of kilowatts.

Having now described my invention in detail, in accordance with the patent statutes, various changes and modifications will suggest themselves to those skilled in this art. It is intended that such changes and modifications shall fall within the spirit and scope of the invention as recited in the following claims.

I claim:

1. Apparatus for measuring the D.-C. current flowing in a conductor comprising a saturable magnetic core magnetically coupled to the said conductor; an exciting winding on the said core; a source of electrical pulses connected to the said exciting winding, the said electrical pulses producing a peak magnetomotive force in the said core which is substantially equal to and opposes the magnetomotive force produced therein by the said D.-C. current; a tertiary winding on the said core; a rectifier connected to the said tertiary winding; a D.-C. amplifier having an input from the said rectifier; and means regulating the amplitude of the said electrical pulses, the said means being controlled by the said D.-C. amplifier output, the amplitude of the said electrical pulses being a measure of the said D.-C. current flowing in the conductor.

2. The invention as recited in claim 1 including a mutual reactor connected between the said source of electrical pulses and the input to the said rectifier.

3. The invention as recited in claim 1 wherein the said source of electrical pulses comprises a thyratron oscillator circuit having a grid circuit connected to the said D.-C. amplifier output.

4. Apparatus for measuring the D.-C. current flowing in a conductor and comprising a first saturable magnetic core magnetically coupled to the said conductor; an exciting winding on the said first core; means producing electrical pulses in the said exciting winding which pulses have a peak magnetomotive force substantially equal and opposite to the magnetomotive force produced in the said first core by the said D.-C. current flowing in the conductor; a second saturable magnetic core having a primary, secondary and tertiary winding; means connecting the said means producing electrical pulses to the said primary winding; a source of D.-C. current connected to the said secondary winding, the said D.-C. current producing a magnetization in the said second core opposing the magnetization produced therein by the said electrical pulses in the said primary winding; a rectifier connected to the said tertiary winding; and a D.-C. amplifier having an input from the said rectifier, the D.-C. amplifier output regulating the amplitude of the said D.-C. current to the said secondary winding, the amplitude of the said D.-C. current being a measure of the said D.-C. current flowing in the said conductor.

5. The invention as recited in claim 4 including a valve having an anode, a cathode and at least one grid therebetween, the output from the said D.-C. amplifier being connected between the said grid and cathode, the anode being connected to the said source of D.-C. current through the said secondary winding whereby the said D.-C. amplifier output regulates the D.-C. current flowing in the said secondary winding.

6. The invention as recited in claim 4 including a mutual reactor connected between the said means producing electrical pulses and the input to the said rectifier.

7. Apparatus for measuring the D.-C. current flowing in a conductor and comprising a first saturable magnetic core magnetically coupled to the said conductor; a first secondary winding on the said first core; a source of electrical pulses connected to the said first secondary winding and in a manner opposing the magnetization produced in the said first core by the said D.-C. current carrying conductor; a first tertiary winding on the said first core; a first rectifier connected to the said first tertiary winding, a first D.-C. amplifier having an input from the said first rectifier; means regulating the amplitude of the said electrical pulses, the said means being controlled by the said D.-C. amplifier output; a second saturable magnetic core having a second primary, secondary and tertiary winding; means connecting the said source of electrical pulses to the said second primary winding; a source of D.-C. current connected to the said second secondary winding; a second rectifier connected to the said second tertiary winding; and a second D.-C. amplifier having an input from the said second rectifier, the said second D.-C. amplifier output regulating the amplitude of the said D.-C. current to the said second secondary winding, the amplitude of the said D.-C. current being a measure of the said D.-C. current flowing in the said conductor.

8. The invention as recited in claim 7 including a first mutual reactor connected between the said source of electrical pulses and the input to the said first rectifier; and a second mutual reactor connected between the said source of electrical pulses and the input to the said second rectifier.

9. The invention as recited in claim 7 wherein the said source of electrical pulses comprises a gas tube oscillator circuit having a grid circuit connected to the said first D.-C. amplifier output.

10. The invention as recited in claim 7 including a valve having an anode, a cathode and at least one grid therebetween, the output from the said second D.-C. amplifier being connected between the said grid and cathode, the said anode being connected to the said source of D.-C. current through the said second secondary winding whereby the said second D.-C. amplifier output regulates the said D.-C. current flowing in the said second secondary winding.

11. The invention as recited in claim 7 including a D.-C. current measuring instrument connected in series circuit with the said second secondary winding.

References Cited in the file of this patent

Article by J. H. Burnett published in Proceedings of the IRE, April 1956, pages 529–532 (only Fig. 5 of page 531 is relied upon). (Copies available in Scientific Library.)